US009500033B2

(12) United States Patent
Menger et al.

(10) Patent No.: US 9,500,033 B2
(45) Date of Patent: Nov. 22, 2016

(54) HIGH LOAD UNIVERSAL JOINT FOR DOWNHOLE ROTARY STEERABLE DRILLING TOOL

(71) Applicant: Schlumberger Technology Corporation, Sugar Land, TX (US)

(72) Inventors: Christian Menger, Recke (DE); Iain Keery, Solihull (GB); Steven Lewis, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 237 days.

(21) Appl. No.: 14/047,858

(22) Filed: Oct. 7, 2013

(65) Prior Publication Data
US 2014/0027185 A1  Jan. 30, 2014

Related U.S. Application Data

(63) Continuation of application No. 13/699,615, filed as application No. PCT/IB2011/002143 on Jun. 17, 2011, now abandoned.

(60) Provisional application No. 61/356,469, filed on Jun. 18, 2010.

(51) Int. Cl.
*E21B 7/06* (2006.01)
*E21B 17/05* (2006.01)
(Continued)

(52) U.S. Cl.
CPC .............. *E21B 7/06* (2013.01); *E21B 7/067* (2013.01); *E21B 17/05* (2013.01); *F16D 3/38* (2013.01); *F16D 3/41* (2013.01)

(58) Field of Classification Search
CPC .......... E21B 7/06; E21B 17/05; E21B 7/067; E21B 17/03; F16D 3/38; F16D 3/41
See application file for complete search history.

(56) References Cited

U.S. PATENT DOCUMENTS 4,126,018 A * 11/1978 Okuda .................... B21B 35/14
                                                                 464/169
5,048,622 A    9/1991 Ide
(Continued)

FOREIGN PATENT DOCUMENTS

BY          6868 C1      3/2005
EP         1355073       3/2005
(Continued)

OTHER PUBLICATIONS

Decision on grant for the equivalent Russian patent application No. 2013102295 issued on Apr. 23, 2014.
(Continued)

*Primary Examiner* — Brad Harcourt

(57) ABSTRACT

A technique facilitates downhole drilling applications by providing a universal joint. The universal joint has a high load carrying capability presented in a compact and simple configuration. The high load carrying capability is achieved by techniques employing unique load transfer mechanisms. For example, higher load capability may be provided by a load sharing principal in which torque loads are jointly transmitted through universal joint pins and the side faces of a universal joint cross. The higher load capability also may be achieved by transferring loads through a monolithic cross having integral pins and a split yoke/clevis assembly. In another embodiment, higher load capability results from using universal joint pins inserted from the inside of the universal joint and screwed outwardly until full engagement with the joint yokes is achieved. Each of the universal joint embodiments also may be designed to enable pressure-sealed flow of drilling mud through the joint.

16 Claims, 7 Drawing Sheets

(51) Int. Cl.
   *F16D 3/38* (2006.01)
   *F16D 3/41* (2006.01)

(56) References Cited

U.S. PATENT DOCUMENTS

| | | |
|---|---|---|
| 5,135,060 A | 8/1992 | Ide |
| 2002/0129945 A1 | 9/2002 | Brewer et al. |
| 2006/0100023 A1* | 5/2006 | Lindenthal .............. F16D 3/385 464/136 |
| 2007/0251726 A1* | 11/2007 | Menger ..................... E21B 7/06 175/55 |
| 2009/0041534 A1* | 2/2009 | Bushey ................ B25J 17/0275 403/57 |

FOREIGN PATENT DOCUMENTS

| | | |
|---|---|---|
| GB | 800194 A | 8/1958 |
| GB | 2129524 A | 5/1984 |
| GB | 2437645 | 9/2009 |
| RU | 2205304 C2 | 5/2003 |
| RU | 34664 U1 | 12/2003 |
| RU | 2248475 C1 | 1/2005 |
| WO | 96/30616 | 10/1996 |

OTHER PUBLICATIONS

Office action for the equivalent Russian patent application No. 2013102295 issued on Jan. 29, 2014.
Office action for the equivalent Chinese patent application No. 201180021725.3 issued on Apr. 18, 2014.
PCT/IB2011/002143 International Search Report and Written Opinion of the International Searching Authority, Aug. 16, 2012, 14 pages.
PCT/IB2011/002143 International Preliminary Report on Patentability, Dec. 19, 2012, 10 pages.

\* cited by examiner

HIGH LOAD UNIVERSAL JOINT FOR DOWNHOLE ROTARY STEERABLE DRILLING TOOL

CROSS-REFERENCE TO RELATED APPLICATION

The present document is a continuation of U.S. patent application Ser. No. 13/699,615, now abandoned, which was a national stage application of International Application No. PCT/IB2011/002143, filed on Jun. 17, 2011, which was based on and claims priority to U.S. Provisional Application Ser. No. 61/356,469, filed Jun. 18, 2010, incorporated herein by reference.

BACKGROUND

Rotary steerable drilling systems based on the "point-the-bit" principle, require a flexible joint in the steering unit to dynamically connect the lower part of the drill string (Bit Shaft end) to the main tool string. The bit shaft axis is tilted by a fixed or variable angle relative to the main tool axis, thereby "pointing" the drill bit in the desired direction of steering. The flexible joint allows the drilling fluid to be pumped through the center of the joint. A sufficiently large radial clearance is maintained between the tool outer diameter and the diameter of the well bore to allow the drilling fluid and the drill cuttings to flow back to surface. The flexible joint transmits the drilling loads (torque and axial load) from the main tool string to the drill bit.

In some rotary steerable drilling systems, for example, the universal joint uses a multitude of ceramic balls in pockets around the circumference of the bit shaft to transmit the drilling torque to a torque ring featuring corresponding cylindrical channels. Load is transferred through point/line contact between the ceramic balls and channels in the torque ring. The axial load is transmitted through a separate set of spherical thrust bearings away from the center of the universal joint. Two pairs of thrust bearings are required to allow compressive and tensional axial loads to be transmitted. Existing designs tend to be complex and limited in load capability, especially for smaller borehole sizes.

SUMMARY

In general, the present invention provides a universal joint system which may be employed in downhole rotary steerable drilling applications. The universal joint has a high load carrying capability presented in a compact and simple configuration. The high load carrying capability is achieved by techniques employing unique load transfer mechanisms. For example, higher load capability may be provided by a load sharing principal in which torque loads are jointly transmitted through universal joint pins and the side faces of a universal joint cross. The higher load capability also may be achieved by transferring loads through a monolithic cross having integral pins and a split yoke/clevis assembly. In another embodiment, higher load capability results from using universal joint pins inserted from the inside of the universal joint and screwed outwardly until full engagement with the joint yokes is achieved. Each of the universal joint embodiments also may be designed to enable pressure-sealed flow of drilling mud through the joint.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a universal joint system which has a high load carrying capability in a compact and simple configuration. The universal joint system is amenable to incorporation into a borehole drilling system. For example, the universal joint system may be used in cooperation with downhole point-the-bit rotary steerable drilling systems to facilitate directional drilling.

One embodiment of the universal joint comprises a Hooke's Joint type system and is constructed in a load-sharing configuration where the torque load is jointly transferred through the universal joint pins and the side faces of a square-shaped centerpiece (cross). The load-sharing allows transfer of torque values well beyond torque limits of conventional universal joints.

In another configuration, a universal joint centerpiece or cross is a monolithic, spherical component with integral pins. The universal joint yokes feature a separable member/clevis part to facilitate assembly of the universal joint. High strength and load-transfer capability is achieved by locating and adjusting the clevis part on the main body via two angled faces. A number of long, high strength bolts are used to solidly connect the clevis piece and the main body of the universal joint. A low friction locating wedge is used to take out any clearance between the main body and the clevis. Repeatability of assembly may be achieved through the angled contact faces and the assembly wedge. The yoke profile is shaped to maximize torque and axial load transfer.

In a third configuration universal joint pins are inserted from an inside of a cross or centerpiece member. The pins feature a threaded section which allows them to be screwed outwardly until they engage with corresponding holes in yokes of the universal joint. In their end position, they locate against a tapered face in the cross to allow application of a high pre-load. This type of universal joint also has the ability to allow internal fluid-flow through the joint, similar to the other embodiments described herein. The upper and lower universal joint parts are connected by a pressure-sealed, flexible tube. In contrast to existing universal joints employed in drilling tools, the embodiments described herein combine load torque capability and axial load transfer into a single component centered around a center point of the universal joint. No additional thrust bearings are required.

Figure 1:
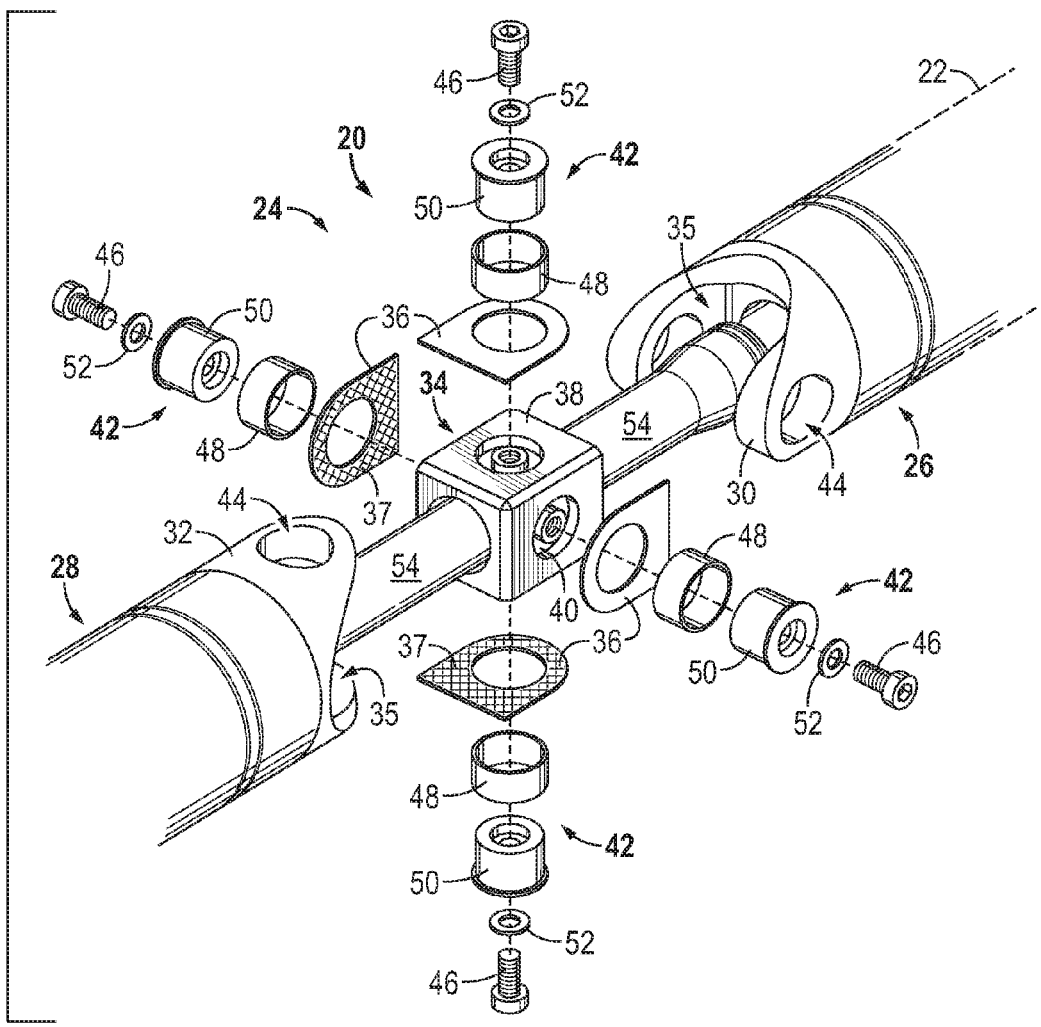
FIG. 1 is an illustration of a load sharing embodiment of a universal joint, according to an embodiment of the present invention.

Referring generally to FIG. 1, an embodiment of a universal joint system 20 is illustrated in a load-sharing configuration where the torque load is jointly transferred through universal joint pins and side faces of a square-shaped centerpiece (cross). The load-sharing allows transfer of torque values well beyond torque limits of conventional universal joints. The universal joint system 20 is illustrated as connected in a drill string 22. As illustrated, the universal joint system 20 comprises a universal joint 24 shown in exploded form as having an upper or main shaft body portion 26 and a lower or bit shaft portion 28. Main shaft body portion 26 and bit shaft portion 28 may be formed out of high strength material, such as high strength stainless steel. Additionally, main body portion 26 and bit shaft portion 28 comprise yokes 30 and 32, respectively, designed for connection to a cross or centerpiece 34, such as the illustrated square-shaped cross or centerpiece.

Both yoke 30 and yoke 32 feature a rectangular, e.g. square-shaped, internal middle region 35 to slidingly receive the centerpiece 34. Thin wear plates 36 may be attached to the inside surfaces of the yokes by suitable fasteners, such as small dowel pins. The thin wear plates 36 may be formed of a high strength material, such as a high strength copper-based bearing alloy. In one embodiment, the wear plates 36 feature a crosshatched pattern of small lubrication channels 37 on an inward surface. The crosshatched, inward surface 37 forms the bearing face for flat external surfaces of a rectangular center part 38 of the cross 34. The cross 34 also is made from a high strength material, such as a high strength stainless steel material. It should be noted that cross 34 also may be formed from high-strength alloy steel in many embodiments, e.g. those embodiments in which the universal joint 24 is filled with oil or another suitable fluid to help exclude drilling fluid and wellbore cuttings from the universal joint. The side faces of rectangular center part 38 may be coated with a wear protection material, such as a tungsten carbide-based coating.

In the embodiment illustrated, the cross 34 has four retention holes 40 into which corresponding universal joint pins 42 are inserted through openings 44 in each of the yokes 30, 32. The universal joint pins 42 may be formed as assemblies from various combinations of fasteners, e.g. bolts 46, bushings 48, spacers 50, and/or washers 52 depending on the specific design of the overall universal joint system 20. Pins 42 effectively connect the main shaft body portion 26 to the bit shaft portion 28 in a flexible manner. According to one embodiment, the universal joint pins 42 comprise components made from high strength materials, such as high strength stainless steel materials, coated with wear protective coatings, such as tungsten carbide coatings. The coatings protect the pins 42 and facilitate flexing of the universal joint as the pins 42 rotate inside corresponding openings 44 of yokes 30, 32. In some designs, openings 44 of yokes 30, 32 are press-fitted with replaceable bearing bushes made from a suitable material, such as a copper-based alloy.

A flexible tube 54 also may be positioned to run through the universal joint 24 and may be sealed relative to the main shaft 26 and bit shaft 28 by suitable o-rings. This flexible tube 54 allows the drilling fluid to pass through from the main body 26 to the bit shaft 28 under differential pressure with respect to the outside of the tool. Externally, the universal joint 24 may be enclosed by means of a flexible rubber boot or a metal bellows, as described in greater detail below with respect to alternate embodiments. The universal joint 24 may be vacuum filled with lubricating oil to minimize the operational wear. Additionally, an external stabilizer sleeve of high-strength material, such as high strength stainless steel, may be rigidly connected to the bit shaft 28 for covering the universal joint/cross 34 and part of the main shaft body portion 26. Hydraulic actuators may be mounted on the outside of the main body portion 26, above the universal joint/cross 34, but on a portion covered by the external sleeve (see stabilizer sleeve 84 described below). In this type of embodiment, the hydraulic actuators are selectively actuated to apply a force to the inside of the external sleeve, thereby offsetting the bit shaft axis relative to the main body axis and hence pointing the bit shaft.

Figure 2:
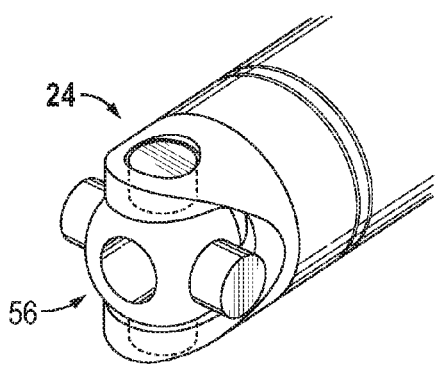
FIG. 2 is an illustration of a monolithic cross embodiment of an alternate universal joint, according to an embodiment of the present invention.
Figure 3:
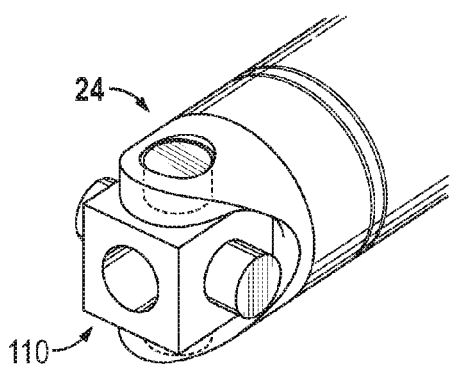
FIG. 3 is an illustration of an internal pin embodiment of an alternate universal joint, according to an embodiment of the present invention.

In FIGS. 2 and 3, alternate embodiments of the universal joint system 20 are illustrated as employing a monolithic cross configuration (FIG. 2) or an internal pin configuration (FIG. 3). Examples of the components, construction and assembly for each of these embodiments are provided in the descriptions set forth below.

Figure 4:
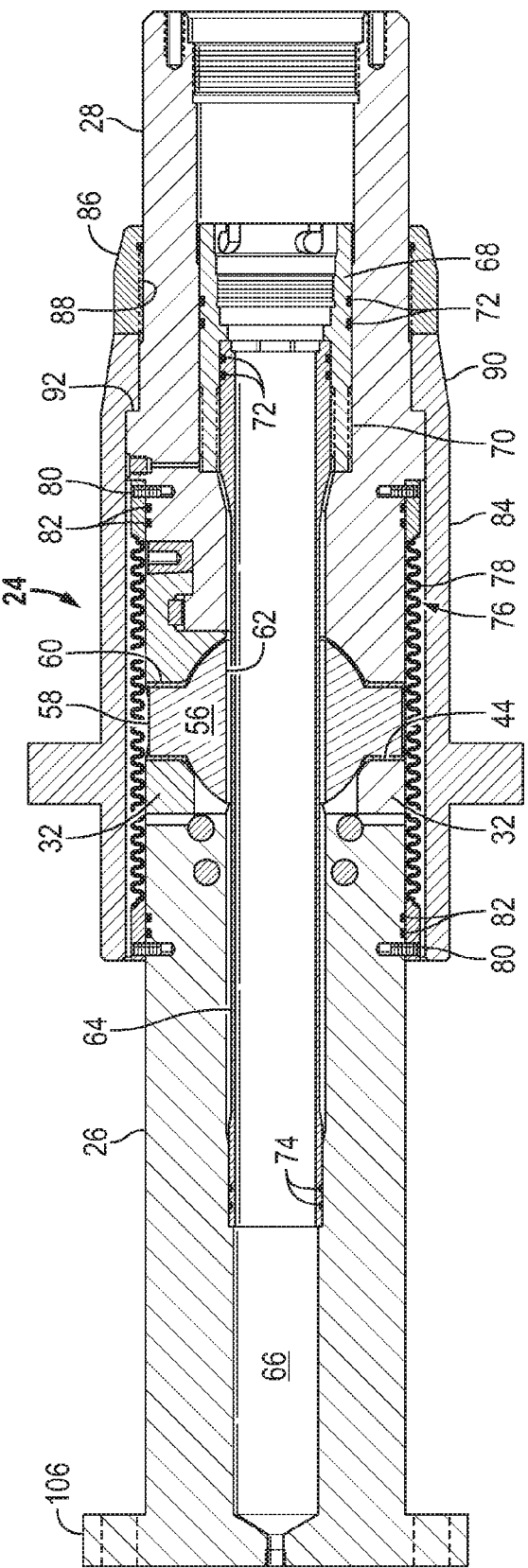
FIG. 4 is a cross-sectional view of a universal joint assembly, according to an embodiment of the present invention.
Figure 5:
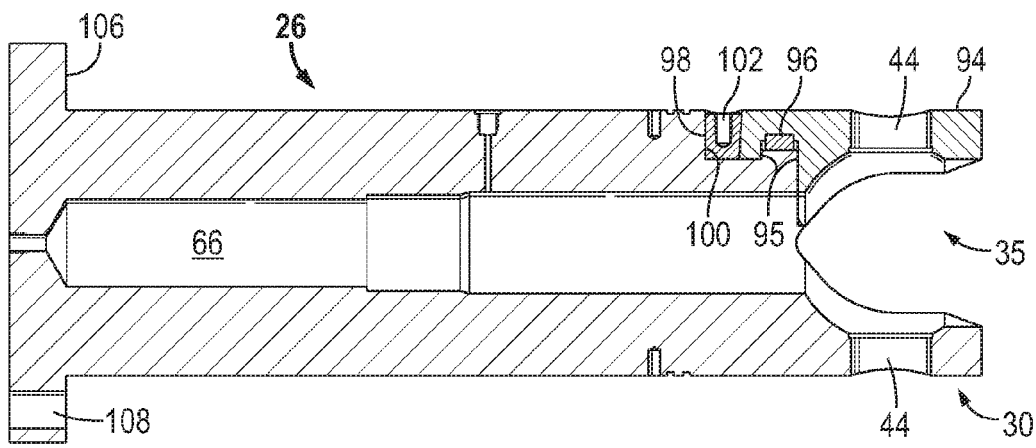
FIG. 5 is a cross-sectional view of a main shaft portion of the universal joint assembly illustrated in FIG. 4, according to an embodiment of the present invention.

Referring generally to FIGS. 4-12, an embodiment of universal joint system 20 is illustrated as incorporating a monolithic cross with integral pins and a split yoke/clevis assembly. FIG. 4 provides a cross-sectional view of the overall universal joint 24 in which the main shaft or body portion 26 is pivotably joined with bit shaft 28 via a monolithic cross member 56 having integral pins 58, i.e. pins formed as inseparable extensions of the monolithic cross member 56. The integral pins 58 are rotatably received within the openings 44 of each yoke/clevis 30 and 32 via bushings 60. The monolithic cross member 56 has an internal opening 62 for receiving a flex tube 64 therethrough. Flex tube 64 flexes to enable pivoting motion of main shaft body portion 26 with respect to bit shaft 28 while maintaining the sealed integrity of the universal joint 24 to enable fluid flow through the universal joint along a sealed flow passage 66.

The flex tube may be secured within the universal joint 24 by a flex tube carrier 68 secured within the interior of bit shaft 28 by a suitable fastening mechanism, such as a threaded region 70. The flex tube carrier 68 is sealed to both flex tube 64 and to an interior of the bit shaft 28 by suitable seals 72, such as O-ring seals. Similarly, the flex tube 64 is sealed to an interior of the main shaft body portion 26 by suitable seals 74, such as O-ring seals. Seals 72 and 74 prevent leakage of fluid flowing through universal joint 24 along flow passage 66 and enable, for example, pressure-sealed flow of drilling mud through the universal joint 24.

In the embodiment illustrated, the universal joint 24 further comprises a bellows assembly 76 surrounding the monolithic cross member 56. The bellows assembly 76 may comprise a bellows 78 secured to the main shaft body portion 26 and/or bit shaft 28 by suitable fasteners 80, such as the illustrated pins. Additionally, the bellows 78 may be sealed with respect to the main shaft body portion 26 and bit shaft 28 by appropriate seals 82, such as O-ring seals.

The universal joint 24 also may comprise a sleeve 84, such as a stabilizer sleeve which extends over the monolithic cross member 56. In the illustrated embodiment, the stabilizer sleeve 84 is disposed radially outward of bellows 78 and secured to the bit shaft 28 by a fastener 86, e.g. a stabilizer lock nut. By way of example, the fastener 86 may be coupled with an exterior surface of bit shaft 28 via a threaded engagement region 88. As the fastener 86 is threaded along threaded engagement region 88, an enlarged end 90 of stabilizer sleeve 84 is secured between the fastener 86 and a shoulder 92 formed on bit shaft 28.

With additional reference to FIGS. 5-8, an embodiment of main shaft body portion 26 is illustrated. In this example, yoke 30 comprises an adjustable portion/clevis 94 which provides a split yoke and enables removal of clearance between the adjustable portion/clevis 94 and the monolithic cross member 56. In some embodiments, an optional key 96 may be disposed between the adjustable clevis 94 and the remainder of the main shaft body portion 26. A wedge member 98 is employed to remove the clearance. (See FIG. 5). By way of example, wedge member 98 may comprise a low friction wedge secured between adjustable clevis 94 and a shoulder 100 of the main body portion 26. An appropriate fastener 102, e.g. a cap screw and washer, may be used to actuate the wedge 98 and adjust clevis 94.

The adjustable portion/clevis 94 is removably attached and facilitates assembly of the universal joint 24 while also providing high-strength and high load transfer capability. By way of example, the adjustable portion/clevis 94 may be located on the remainder of main body 26 via two appropriately angled faces 95. As illustrated best in FIG. 7, the adjustable portion 94 may be secured to the remainder of main body portion 26 by a suitable fastener 104, such as a plurality of long, high-strength bolts.

Figure 6:
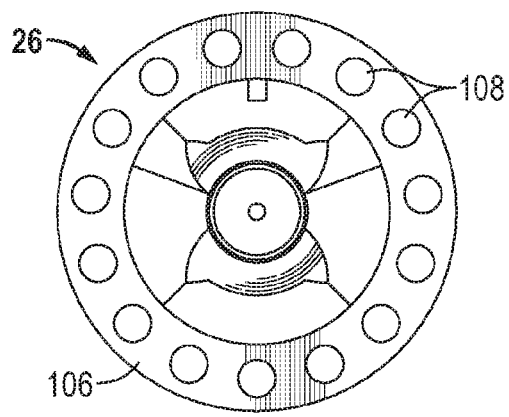
FIG. 6 is an end view of a main shaft portion of the universal joint assembly illustrated in FIG. 4, according to an embodiment of the present invention.
Figure 7:
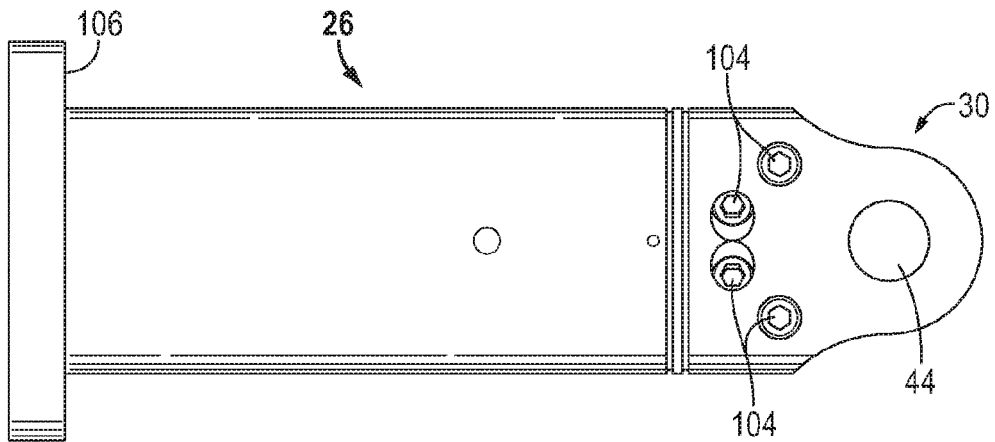
FIG. 7 is a side view of a main shaft portion of the universal joint assembly illustrated in FIG. 4, according to an embodiment of the present invention.
Figure 8:
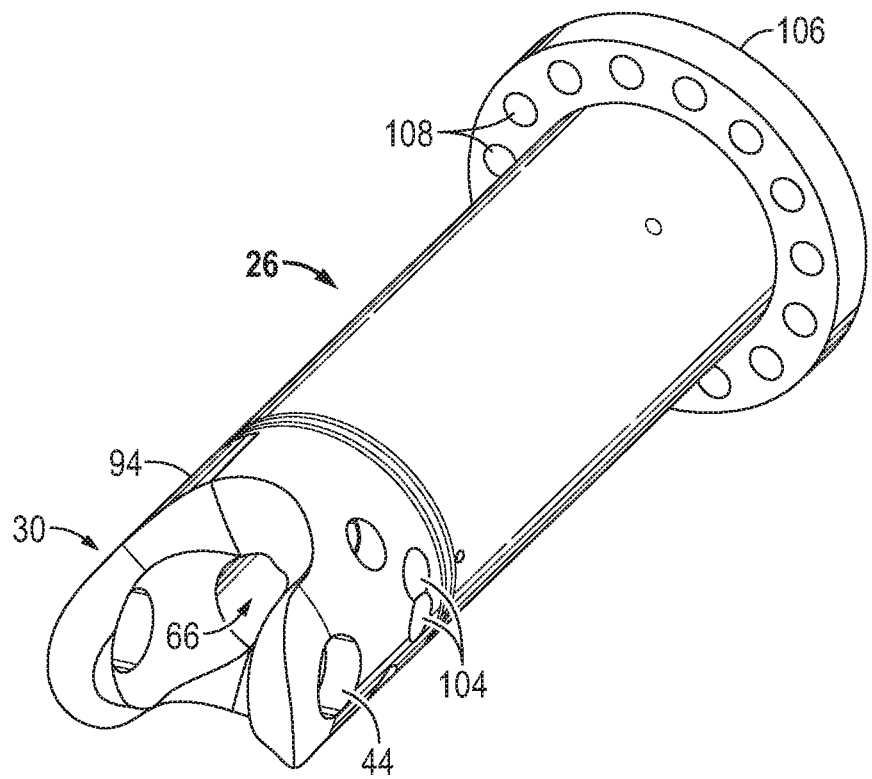
FIG. 8 is an orthogonal view of a main shaft portion of the universal joint assembly illustrated in FIG. 4, according to an embodiment of the present invention.
Figure 9:
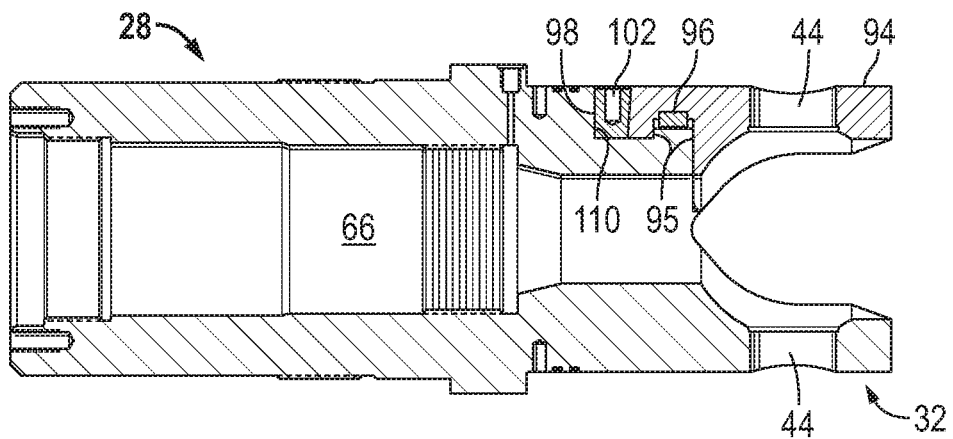
FIG. 9 is a cross-sectional view of a bit shaft portion of the universal joint assembly illustrated in FIG. 4, according to an embodiment of the present invention.
Figure 10:
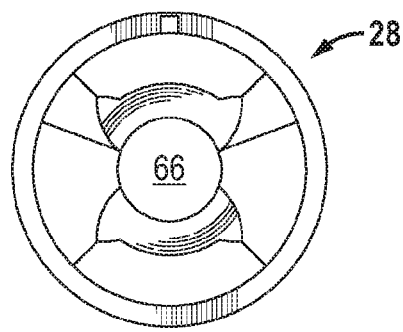
FIG. 10 is an end view of a bit shaft portion of the universal joint assembly illustrated in FIG. 4, according to an embodiment of the present invention.
Figure 11:
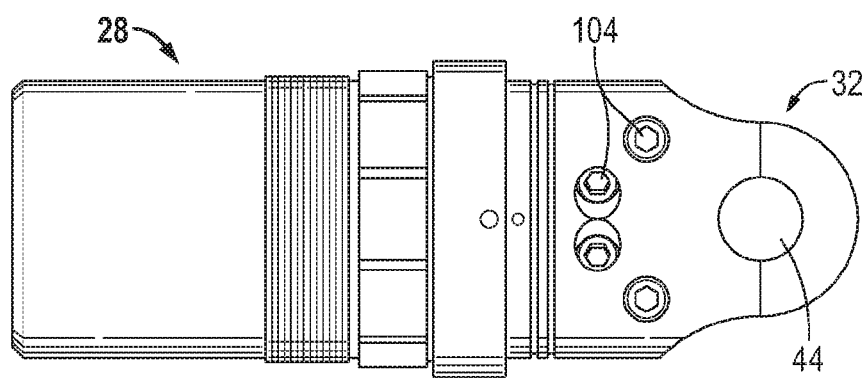
FIG. 11 is a side view of a bit shaft portion of the universal joint assembly illustrated in FIG. 4, according to an embodiment of the present invention.
Figure 12:
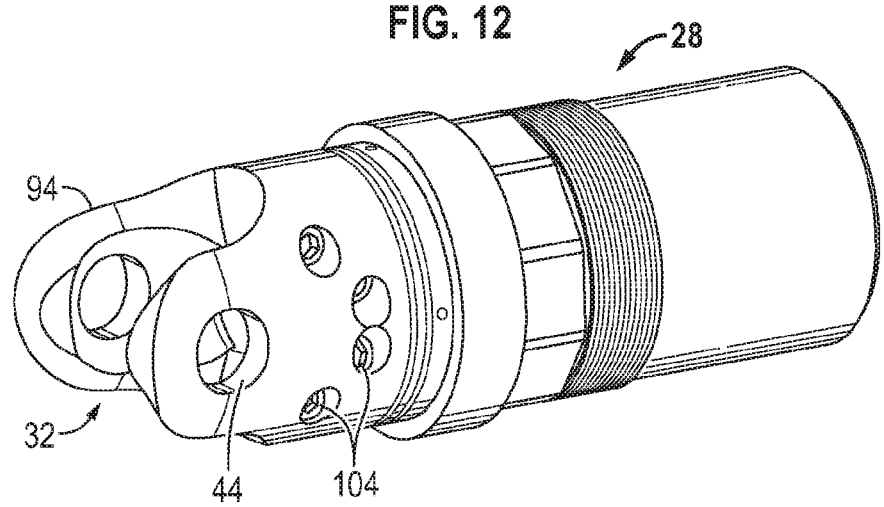
FIG. 12 is an orthogonal view of a bit shaft portion of the universal joint assembly illustrated in FIG. 4, according to an embodiment of the present invention.

Depending on the environment and the design of the components with which universal joint 24 is utilized, the main shaft body portion 26 may comprise a variety of other features. As best illustrated in FIGS. 6 and 8, for example, portion 26 may comprise a mechanism 106 for coupling the universal joint 24 to adjacent drill string components. In a typical downhole application, the mechanisms 106 may comprise standard oilfield pipe connections. However, in other embodiments, mechanism 106 may comprise a flange or other attachment member having a plurality of openings 108 for receiving bolts or other fasteners therethrough.

With additional reference to FIGS. 9-12, an embodiment of bit shaft 28 is illustrated. In this example, yoke 32 is a split yoke and comprises the adjustable portion/clevis 94 which similarly enables removal of clearance between the adjustable portion/clevis 94 and the monolithic cross member 56. In some embodiments, another optional key 96 may be disposed between the adjustable portion 94 and the remaining portion of the bit shaft 28. Another wedge member 98 is employed to remove the clearance. (See FIG. 9). By way of example, wedge member 98 may comprise a low friction wedge secured between adjustable clevis 94 and a shoulder 110 of the bit shaft 28. Again, a fastener 102, e.g. a cap screw and washer, may be used to actuate the wedge 98 and adjust clevis 94.

The adjustable portion/clevis 94 of main body portion 26 and of bit shaft 28 cooperate to facilitate assembly of the universal joint 24 while increasing high-strength and load transfer capability. By way of example, the adjustable portion/clevis 94 of the bit shaft 28 may be located on the remainder of bit shaft 28 via two appropriately angled faces 95. As illustrated best in FIGS. 10-12, the adjustable portion 94 may be secured to the remainder of bit shaft 28 by fastener 104, e.g. a plurality of long, high-strength bolts.

Of course, the number, type, size and arrangement of components may be adjusted according to the specifics of a given application. Furthermore, the various components may be assembled to form the universal joint (illustrated in cross-section in FIG. 4) in a variety of arrangements and according to a variety of assembly procedures. However, one example of an assembly procedure is discussed below to facilitate an understanding of this type of universal joint. However, the assembly procedure should not be construed as limiting, and other procedures and components may be employed.

Initially, seals 82 are positioned on main shaft body portion 26 and on bit shaft 28. The seals 72 and 74 are then positioned on the flex tube 64 and on the flex tube carrier 68. Bushings 60 are pressed into the openings 44 of the body portion 26 and bit shaft 28. Keys 96 may then pressed into position on the body portion 26 and the bit shaft 28. Subsequently, the bellows assembly 76 may be slid over the shaft/body portion 26, and the monolithic cross member 56 is inserted into a corresponding bushing 60 in the body portion 26. The adjustable portion 94 of body portion 26 is then assembled onto the monolithic cross member 56 and secured by fasteners 104, e.g. cap screws and washers. The wedge portion 98 may then be placed into position and secured by fastener 102, e.g. a cap screw and washer, to remove any undesired clearance. The fasteners 104 may then be tightened to full torque.

The bit shaft 28 may then be assembled to the monolithic cross member 56 by inserting the appropriate integral pin 58 into the corresponding bushing 60 of the bit shaft 28. The adjustable portion/clevis 94 is then secured to the bit shaft 28 by fasteners 104, and the wedge portion 98 is placed into position via fastener 102 to remove any undesired clearance. The fasteners 104 are then tightened with respect to the bit shaft 28 to full torque. The bellows 78 is then slid back over the monolithic cross member region of the universal joint and secured via fastener pins 80.

Additionally, flex tube 64 may be secured to flex tube carrier 68 by, for example, threaded engagement. The flex tube 64 and flex tube carrier 68 are inserted into the universal joint 24, and the flex tube carrier 68 is secured to the bit shaft 28 by, for example, threaded engagement. The universal joint 24 may then be vacuum filled with oil through one or more appropriate fill ports. Once completed, the fill port or ports may be plugged. The stabilizer sleeve 84 is then slid over bit shaft 28 and secured at a radially external position with respect to the monolithic cross member 56 by fastener 86, e.g. a stabilizer lock nut.

Figure 13:
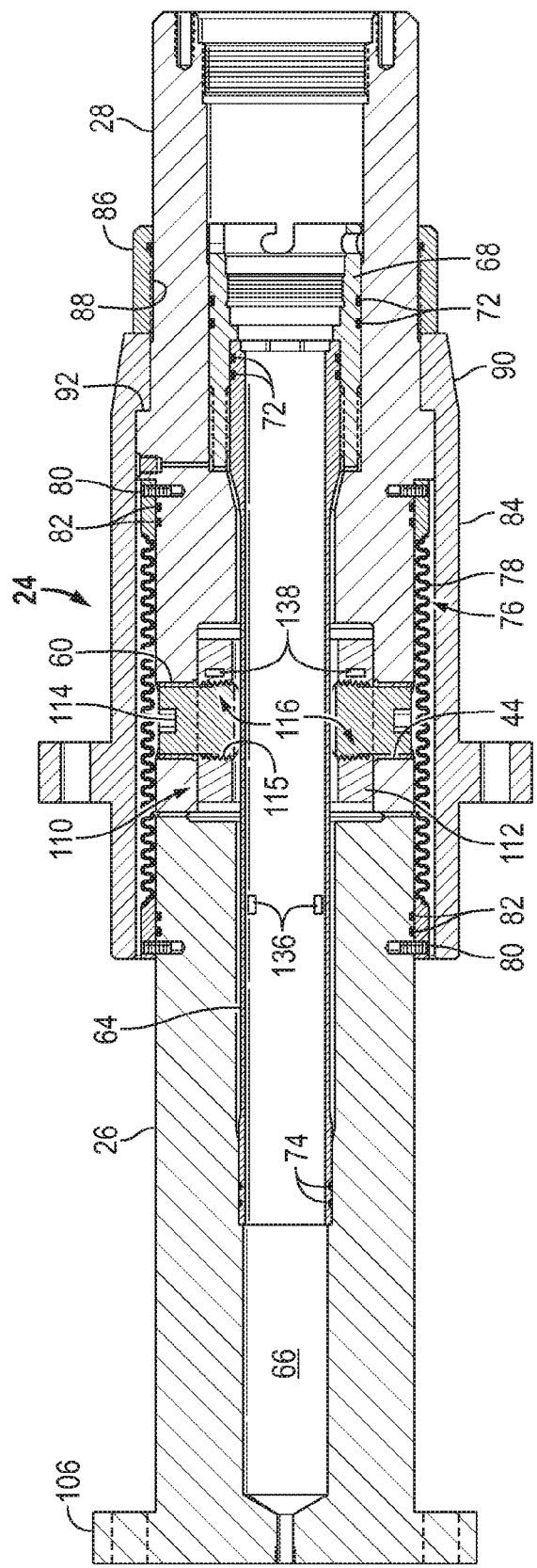
FIG. 13 is an illustration of another example of a universal joint, according to an alternate embodiment of the present invention.

Referring generally to FIG. 13, another embodiment of universal joint system 20 is illustrated as incorporating an internal pin assembly. FIG. 13 provides a cross-sectional view of this embodiment of the overall universal joint 24. It should be noted that components which are common with components of other embodiments described above have been labeled with the same reference characters.

In this embodiment, the universal joint 24 flexes about a taper lock cross assembly 110 having a taper lock cross member 112 and a plurality of adjustable pins 114. The adjustable pins 114 extend outwardly from the taper lock cross member 112 and into the clevis openings 44 for pivoting motion within bushings 60 when main shaft body portion 26 pivots with respect to bit shaft 28. In this example, the adjustable pins 114 comprise a threaded section 116 which allows the pins 114 to be adjusted outwardly, e.g. screwed outwardly, until they engage with the corresponding holes 44 of the yokes 30, 32. The adjustable pins 114 can be adjusted to locate against corresponding tapered faces 115 in the taper lock cross member 112 which enables application of a high pre-load.

As with previous embodiments, the number, type, size and arrangement of components may be adjusted according to the specifics of a given application. Furthermore, the various components may be assembled to form the universal joint (illustrated in cross-section in FIG. 13) in a variety of arrangements and according to a variety of assembly procedures. However, one example of an assembly procedure is discussed below to facilitate an understanding of this type of universal joint. However, the assembly procedure should not be construed as limiting, and other procedures and components may be employed.

Initially, seals 82 are positioned on main shaft body portion 26 and on bit shaft 28. The seals 72 and 74 are then positioned on the flex tube 64 and on the flex tube carrier 68, and bushings 60 are pressed into the openings 44 of the body portion 26 and bit shaft 28. Subsequently, the bellows assembly 76 may be slid over the shaft body portion 26. After placement of the bellows assembly 76, the adjustable pins 114, e.g. taper lock pins, are inserted into the taper lock cross member 112, and the assembly is coupled to the body portion 26 by pulling the adjustable pins 114 through the bushings 60 and threading them into the taper lock cross member 112.

The two other adjustable pins 114 may then be inserted into the taper lock cross member 112. The assembly may be coupled to the bit shaft 28 by pulling the pins 114 through the corresponding bushings 60 in the bit shaft openings 44 and threading them into the taper lock cross member 112. The bellows 78 is then slid back over the taper lock cross assembly region of the universal joint 24 and secured via fastener pins 80.

Additionally, flex tube 64 may be secured to flex tube carrier 68 by, for example, threaded engagement. The flex tube 64 and flex tube carrier 68 are then inserted into the universal joint 24, and the flex tube carrier 68 is secured to the bit shaft 28 by, for example, threaded engagement. The universal joint 24 may then be vacuum filled with oil through one or more appropriate fill ports. Once completed, the fill port or ports may be plugged. The stabilizer sleeve 84 is then slid over bit shaft 28 and secured at a radially external position with respect to the taper lock cross assembly 56 by fastener 86, e.g. a stabilizer lock nut.

The universal joint 24 may be employed in a variety of environments and applications. For example, the various embodiments of universal joint 24 may be employed in high load applications, such as wellbore drilling applications. The unique designs of the universal joint embodiments described herein combined high load torque capability and high axial load transfer into a single universal joint component. Although the universal joint 24 may be employed in various applications, a drilling application is illustrated in FIG. 14.

Figure 14:
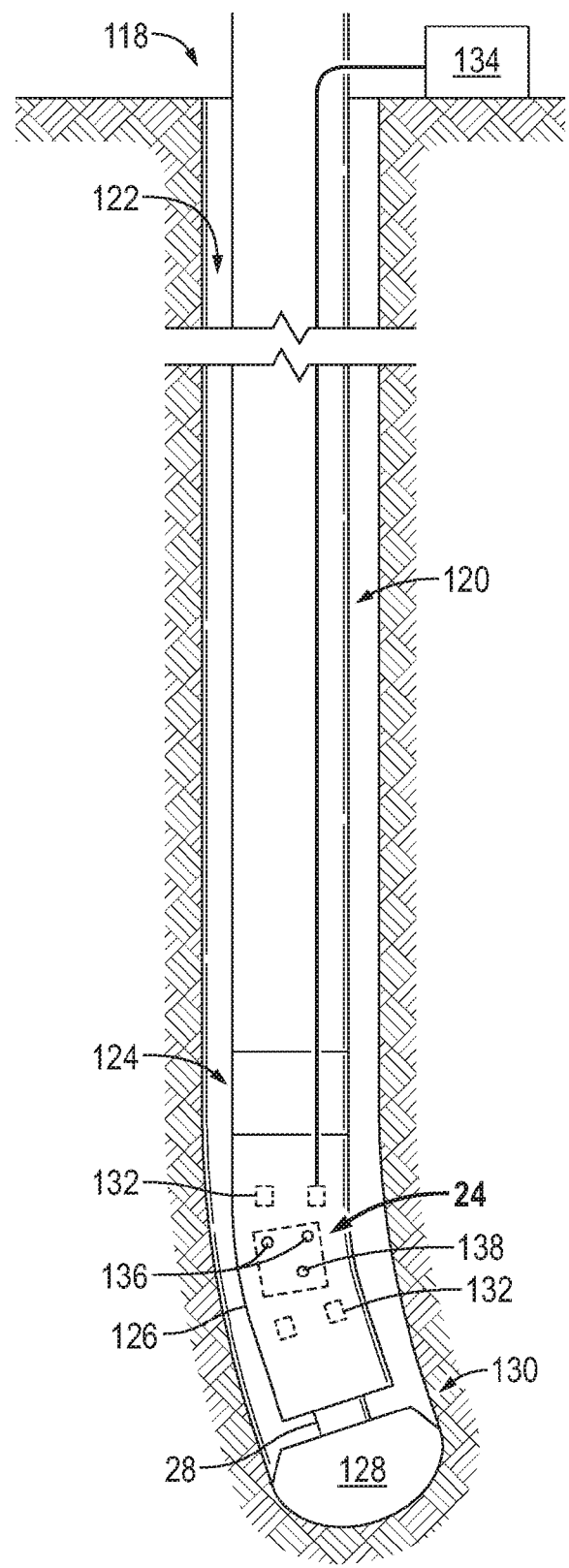
FIG. 14 is an illustration of an embodiment of the universal joint employed in a rotary steerable system mounted in a drill string for drilling a wellbore, according to an embodiment of the present invention.

Referring generally to FIG. 14 a drilling system 118 is illustrated as comprising a drill string 120 deployed in a wellbore 122. The drilling system 118 is employed in a lateral wellbore or a multilateral wellbore drilling application. In this example, the drill string comprises bottom hole assembly 124 having a rotary steerable system 126 designed to direct a drill bit 128, thus facilitating drilling of one or more lateral wellbores 130. By way of example, the rotary steerable system 126 is a point-the-bit type rotary steerable system. The rotary steerable system 126 comprises universal joint 24, which gives the overall drilling system a high load torque capability and a high axial load transfer capability. In some applications, actuators 132, e.g. hydraulic actuators, may be employed to control the amount of pivotal movement of bit shaft 28 with respect to shaft portion 26. Some embodiments of universal joint 24 position the actuators 132 between main shaft body portion 26 and the external stabilizer sleeve 84 to cause pivoting motion of the universal joint by moving sleeve 84 with respect to portion 26. The actuators 132 are controlled by a suitable control system 134, such as the illustrated control system positioned at a surface location.

In some embodiments, the control system 134 also may be utilized as a feedback system to evaluate feedback from sensors mounted to the universal joint 24. Referring to FIG. 13 in addition to FIG. 14, one or more sensors 136, e.g. strain gauges, may be mounted on the flex tube 64 or at other suitable locations of universal joint 24. Similarly, one or more sensors 138, e.g. position sensors, may be mounted on the universal joint 24 to detect angle/orientation of the universal joint. The sensors 136, 138 may be used in cooperation with control system 134 to create a downhole feedback loop. The data on angle/orientation of the universal joint 24, as well as data on loading, may be processed by control system 134. Based on this processing, appropriate control signals may then be sent to rotary steerable system 126 and actuators 132. Sensors 136, 138 may be used on any of the embodiments described herein.

The universal joint system embodiments 20 described above provide relatively simple constructions that achieve high load carrying capability. Many of the specific connectors, seals, pins, shapes, and materials of the components described above may be altered according to the environment, joint configuration, and drilling application. Additionally, components may be removed, added or substituted; and the configuration and arrangement of components may be adjusted to suit a particular application.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system for drilling a borehole, comprising:
   a universal joint coupled into a drill string, the universal joint comprising:
   a main body portion having a main body yoke with internal surfaces;
   a bit shaft portion having a bit shaft yoke with internal surfaces;
   a centerpiece coupling the main body portion to the bit shaft portion, the centerpiece having side faces which correspond with the internal surfaces of the main body portion and the bit shaft portion, the side faces being shaped to jointly transfer torque loads over a plurality of the side faces;
a bellows surrounding the centerpiece; and
a stabilizer sleeve positioned around the bellows.

2. The system as recited in claim 1, wherein the side faces comprise four generally flat side faces.

3. The system as recited in claim 1, wherein the universal joint comprises an internal passage to conduct flowing drilling mud.

4. The system as recited in claim 1, wherein the universal joint comprises four hardened pins which secure the yokes to the centerpiece.

5. The system as recited in claim 1, wherein a wear plate is positioned along an interior surface of each yoke.

6. The system as recited in claim 5, wherein each wear plate comprises oil channels on a surface oriented for engagement with a corresponding side face of the centerpiece.

7. The system as recited in claim 4, wherein the four hardened pins are coated with a wear protective coating.

8. The system as recited in claim 7, wherein the wear protective coating comprises tungsten carbide.

9. A system for drilling a borehole, comprising:
a universal joint coupled into a drill string, the universal joint comprising:
a main body portion having a main body yoke with internal surfaces;
a bit shaft portion having a bit shaft yoke with internal surfaces; and
a centerpiece coupling the main body portion to the bit shaft portion, the centerpiece comprising a monolithic crossmember having integral pins to enable pivoting motion of the bit shaft portion with respect to the main body portion; and
a flexible tube extending through the centerpiece and the universal joint to conduct flowing drilling mud through the monolithic crossmember of the centerpiece, wherein the main body yoke and the bit shaft yoke are each formed as split yokes having an adjustable yoke member.

10. The system is recited in claim 9, further comprising a bellows surrounding the centerpiece.

11. The system as recited in claim 10, further comprising a stabilizer positioned around the bellows.

12. A system for drilling a borehole, comprising:
a universal joint coupled into a drill string, the universal joint comprising:
a main body portion having a main body yoke with internal surfaces;
a bit shaft portion having a bit shaft yoke with internal surfaces; and
a centerpiece coupling the main body portion to the bit shaft portion, the centerpiece cooperating with adjustable, universal joint pins inserted from an interior of the universal joint and threaded outwardly into full engagement with the main body yoke and the bit shaft yoke.

13. The system as recited in claim 12, wherein the universal joint comprises an internal passage to conduct flowing drilling mud.

14. The system as recited in claim 12, wherein the main body yoke and the bit shaft yoke are each formed as a split yokes having an adjustable yoke member.

15. The system is recited in claim 12, further comprising a bellows surrounding the centerpiece.

16. The system as recited in claim 15, further comprising a stabilizer positioned around the bellows.

* * * * *